United States Patent [19] [11] Patent Number: 5,823,721
Wagenseil [45] Date of Patent: Oct. 20, 1998

[54] METHOD OF PRODUCING AN UNDERCUT, CONCAVE, SELF-CONTAINED BEARING SURFACE

[75] Inventor: Ludwig Wagenseil, Vöhringen, Germany

[73] Assignee: Brueninghaus Hydromatik GmbH, Elchingen, Germany

[21] Appl. No.: 702,521

[22] PCT Filed: Feb. 10, 1995

[86] PCT No.: PCT/EP95/00494

§ 371 Date: Oct. 21, 1996

§ 102(e) Date: Oct. 21, 1996

[87] PCT Pub. No.: WO95/23664

PCT Pub. Date: Sep. 8, 1995

[30] Foreign Application Priority Data

Mar. 2, 1994 [DE] Germany ............ 44 06 856.5

[51] Int. Cl.⁶ .................................................. B23C 9/00
[52] U.S. Cl. .................. 409/132; 29/898.048; 409/143; 409/165; 409/199; 409/201
[58] Field of Search .................... 409/132, 143, 409/162, 165, 166, 199, 201, 211; 29/898.048

[56] References Cited

U.S. PATENT DOCUMENTS

| 2,499,842 | 3/1950 | Armitage | 409/199 |
|---|---|---|---|
| 3,212,405 | 10/1965 | Smith . | |
| 4,245,939 | 1/1981 | Sear | 409/199 |
| 4,593,444 | 6/1986 | Kavthekar . | |
| 4,625,377 | 12/1986 | Kavthekar | 29/898.048 |
| 4,813,828 | 3/1989 | Beck et al. | 409/132 |
| 5,031,303 | 7/1991 | Orain | 29/559 |
| 5,197,228 | 3/1993 | Sharkey, III et al. | 51/165.71 |

FOREIGN PATENT DOCUMENTS

| 39 20 969 | 1/1991 | Germany . | |
|---|---|---|---|
| 537762 | 3/1977 | U.S.S.R. | 409/199 |

*Primary Examiner*—A. L. Pitts
*Assistant Examiner*—Christopher Kirkman
*Attorney, Agent, or Firm*—Scully, Scott, Murphy & Presser

[57] ABSTRACT

The invention relates to a method of producing concave, self-contained bearing surfaces, which are at least part of spherical indentations which extend beyond the sphere equator, by means of machining involving the removal of material of pre-formed indentations in workpieces by means of a tool having a tool cutting edge orbiting around a tool axis of rotation with an orbit diameter which is equal to the length of a chord extending up to a deepest point of the bearing surface, whereby the cutting movement is made up of the orbital movement of the tool cutting edge and a rotational relative movement between workpiece and tool around a vertical axis through the sphere center, and the feed movement is a movement of the tool relative to the workpiece along the tool axis of rotation which is obliquely set at the same angle of inclination relative to the vertical axis as is the chord set to the sphere equator. For reducing manufacturing times and increasing the dimensional exactitude of the bearing surface it is proposed in accordance with the invention that the chord (S) originates from the sphere equator (A), and the regions of the indentation (7) to the two sides of the sphere equator (A) are machined with two separate feed movements. The invention further relates to a bearing surface as product of this method.

9 Claims, 1 Drawing Sheet

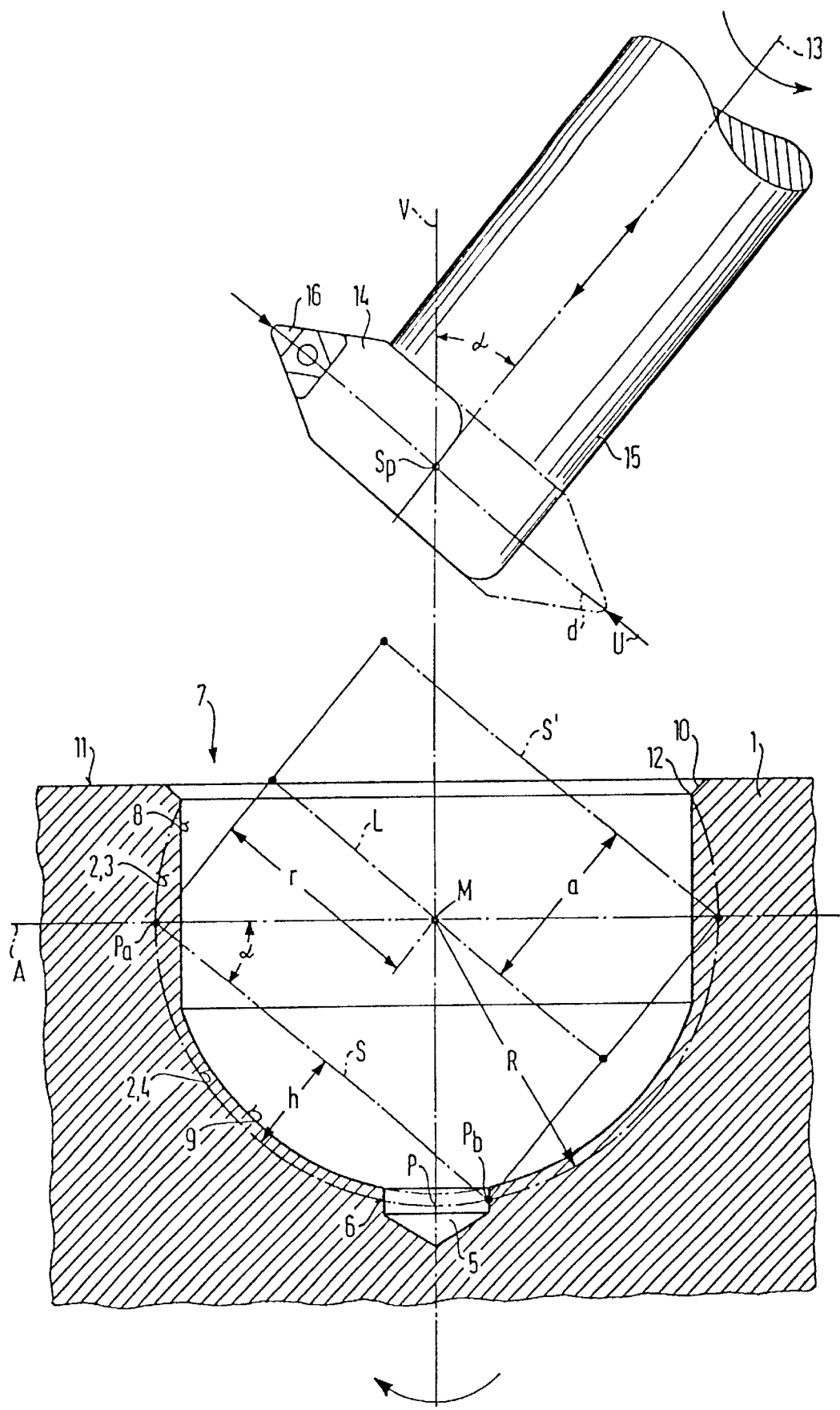

METHOD OF PRODUCING AN UNDERCUT, CONCAVE, SELF-CONTAINED BEARING SURFACE

The invention relates to a method of producing an undercut, concave and self-contained bearing surface in accordance with the preamble of claim 1.

This method is known as so-called spinner method, which is employed in the manufacture of axial and radial piston machines for forming hollow sphere segments in stroke-generating bodies intended for mounting ball end pins at displacement bodies or slippers, which stroke-generating bodies are for example the drive disks of bent axis machines, slippers or displacement bodies, such as for example pistons. The concave bearing surface of each hollow sphere segment extends beyond the equator of the sphere; its region located above the equator thus being undercut and assuming, for example in the case of the mounting of a piston, the necessary piston return function.

The diameter of the tool cutting edge orbit is equal to the length of a chord which extends from the upper limiting edge of the rounded indentation-like concave bearing surface to its lower apex. By feeding the tool, introduced into the indentation, along its obliquely set tool axis of rotation, set at the same angle of inclination to the vertical axis as the chord to the upper limiting edge or sphere equator, so far that the cutting edge orbit impinges upon the upper limiting edge of the bearing surface and therewith also on its lower apex, the desired hollow sphere segment is formed.

As a consequence of the angle of inclination of greater than 45°, determined through the size of the undercut, which the tool axis of rotation encloses with the vertical axis, there is required a relatively thin tool mounting shaft which allows only a correspondingly small loading and feed speed of the tool, since otherwise the necessary high working precision cannot be ensured. This means that the manufacturing times are undesirable long and it is not certain that the necessary dimensional exactitude of the bearing surface can be attained.

It is the object of the invention to so further develop the method mentioned in the introduction that the manufacturing time can be reduced and the dimensional exactitude of the undercut bearing surface can be increased.

This object is achieved in that the chord, which determines the diameter of the cutting edge orbit, extends from the sphere equator, and in that the region of the indentation below the sphere equator and that above the sphere equator are machined one after the other with two separate feed movements.

In this way, when determining the diameter of the cutting edge orbit, the undercutting of the bearing surface is not taken into consideration, so that the tool axis of rotation is, during the feed, obliquely set with an angle of inclination with respect to the vertical axis which is equal to or smaller than 45°. Correspondingly, the tool mounting shaft can be formed more strongly so that it can withstand greater loading and thus higher feed speeds of the tool and therewith makes possible shorter manufacturing times with higher dimensional accuracy. The diameter of the cutting edge orbit determined in accordance with the invention, not taking into account the undercutting of the bearing surface, makes it necessary to produce the two bearing surface regions below and above the sphere equator in two separate feed movements which are preferably carried out with the tool axis of rotation in the same disposition, that is along the same feed axis, in opposite directions. The extra time needed for these two feed movements is, in comparison with the prior art, very small and is more than compensated for by the time gain afforded by the higher feed speeds.

For the production of the two bearing surface regions to the two sides of the sphere equator with the same radius R, the tool introduced into the indentation is expediently moved more deeply into the indentation with one the two feed movements along the inclined tool axis of rotation until it takes up an end position, upon completion of the bearing surface region below the sphere equator, in which end position the plane of the cutting edge orbit contains the chord of the sphere with the radius R; then, the tool is moved with the other feed movement having opposite direction until it takes up a further end position, upon completion of the bearing surface region above the sphere equator, in which further end position the plane of the cutting edge orbit contains a further chord parallel to the first-mentioned chord and with the same length in the sphere with the radius R.

In accordance with a further development of the invention, in addition to the feed movement along the tool axis of rotation carried out during the production of the bearing surface region above the sphere equator, the tool is moved in a further feed movement perpendicularly to the sphere equator in a direction towards the outside of the indentation. In this manner there can be produced a bearing surface the bearing surface regions of which to the two sides of the sphere equator have like radii which extend from two middle points lying on the vertical axis, displaced one to the other. Thereby there is provided the necessary play in the bearing surface region above the sphere equator for the functioning of the ball joint formed by the concave bearing surface and the ball end pin, in particular for the formation of a lubrication film, without adversely affecting the functioning of the bearing surface region below the sphere equator, the radius of which can be so adapted to the ball end pin that in this region there prevails a play which is as small as possible.

The necessary play in the bearing surface region above the sphere equator can also be attained with a bearing surface the bearing surface region of which above the sphere equator has a radius which is larger than the radius of the bearing surface region below the sphere equator. This larger radius is expediently produced in that the tool is moved, with the other of the two feed movements along the tool axis of rotation obliquely set with the angle of inclination, with a correspondingly greater feed than in the case of the production of the above-mentioned bearing surface region with the same radius to the two sides of the sphere equator, so that upon completion of the bearing surface region above the sphere equator the tool takes up a further end position in which the plane of the cutting edge orbit contains a further chord, parallel to the first-mentioned chord, of the same length which runs in a sphere having a radius which is greater than the radius of the sphere having the first-mentioned chord.

If the bearing surface takes up the entire spherical indentation the chord determining the diameter of the cutting edge orbit connects the sphere equator with the lower apex of the spherical indentation. A chord running in this way can be employed also for the case that the bearing surface takes up only a part of the spherical indentation, i.e. is formed as a spherical zone open at its lower boundary edge. However, with such a spherical zone open at its lower boundary edge, it is more favourable to connect with the chord a point of this lower boundary edge with a point on the sphere equator lying diametrally opposite, in order in this way to attain a lesser oblique positioning of the tool axis of rotation relative to the vertical axis, i.e. to make possible a stronger tool machining shaft.

Further features and advantages of the invention are apparent from the remaining subclaims.

Below, the invention is described with reference to a preferred exemplary embodiment and with reference to the single attached FIGURE which shows a tool approaching a workpiece, in vertical section.

The workpiece 1 partly illustrated in the FIGURE is the drive disk of a bent axis machine. There are to be formed in this drive disk a number of hollow sphere segments, having a radius R, for bearing ball end pins (not shown), which are located at the free ends of the pistons of the bent axis machine. The concave bearing surfaces 2 of the hollow sphere segments are undercut, i.e. they extend beyond the respective sphere equator A, so that they ensure the return movement of the piston. The bearing surface region above the sphere equator A is indicated with the reference sign 3 and the region below the sphere equator is indicated with the reference sign 4. In the lower apex point P of the bearing surface 2 there is formed a centring bore 5 which determines the lower limiting edge 6 of the hollow sphere segment and the disposition of a vertical axis V running perpendicularly of the sphere equator A through the sphere centre point M.

The hollow sphere segments are prepared as accurately as possible on the circular arc of the pistons with a form drilling and boring tool (not shown) with the formation of indentations 7, each with the centring bore 5. Each indentation 7 has an upper, cylindrical surface part 8 which extends to below the sphere equator A and a lower surface part 9 in the form of a spherical zone. The upper edge of the upper, cylindrical surface part 8 is connected with the upper surface 11 of the workpiece 1 via a chamfer 10 and represents the upper limiting edge 12 of the concave bearing surface 2.

The lower surface part 9 of the indentation 7 and the concave bearing surface 2 have each the form of a spherical indentation, if no centring bore is employed.

Each indentation 7 is to be transformed, through machining with the removal of material, by means of a tool 14 rotatable around a tool axis of rotation 13, into a hollow sphere segment. The tool 14, merely schematically illustrated, is mounted on a rotatable tool mounting shaft 15, rotatable with the aid of a rotary drive (not shown), the longitudinal middle axis of which shaft forms the tool axis of rotation 13. It has a tool cutting edge 16 with a cutting part at the end face as the main cutter and an auxiliary cutter on the circumference. The diameter d of the cutting edge orbit U is greater than the diameter of the tool mounting shaft 15 and is so chosen that it is equal to the length of a chord S which extends from an arbitrary point $P_a$ on the sphere equator A up to a diametrically opposite point $P_b$ on the lower limiting edge 6.

The workpiece 1 is so mounted on a rotary table (not shown) rotatable around a vertical axis of rotation, by means of a mounting device (likewise not shown), that the circular arc on which the indentations 7 are arranged cuts the axis of rotation of the rotary table. The mounting device may be rotated in steps around the centre of the circular arc relative to the rotary table, in order in each case to bring one of the centring bores 5 of the indentations 7 into congruence with the vertical axis of rotation of the rotary table. As soon as this takes place the rotary table and thus the workpiece 1 are caused to rotate, for example clockwise.

The tool 14 is mounted, above the workpiece 1, in a mounting device (not shown), which is pivotable around a horizontal pivot axis and traversable horizontally and vertically, by means of its tool mounting shaft 15 and is, by means of corresponding pivoting relative to the vertical axis V defined by means of the centring bore 5 and coinciding with the rotational axis of the rotary table, obliquely set with an angle of inclination a which is equal to the angle which the chord S makes with the sphere equator A. The tool 14 is set in rotation, in counter-clockwise direction, by means of a drive (not shown) and then moved so far along its tool axis of rotation 13 until the point of intersection Sp of the orbit U of the tool cutting edge 16 with the tool axis of rotation 13 lies on the vertical axis V, as is shown in the FIGURE. Then, the tool 14 is moved into the indentation 7 along the vertical axis V until the point of intersection Sp lies on the sphere equator A, i.e. until the cutting edge orbit U coincides with the chain line L in the FIGURE.

In order now to produce the bearing surface region 4 below the sphere equator A, by machining with the removal of material, the tool 14 is moved with a first feed movement along its tool axis of rotation 13 obliquely downwardly as far as a first end position illustrated by the chain line S in the FIGURE, in which the chord S lies in the plane of the cutting edge orbit U. The feed a is equal to the radial spacing of the chord S from the sphere centre M.

Then, the tool 14 is moved by means of a second feed movement with the feed a along the tool axis of rotation 13 directed oppositely to the direction of the first feed movement, so far that its cutting edge orbit U again touches the sphere equator A and thus takes up the second end position illustrated in the FIGURE by means of the chain line S', in which the plane of the cutting edge orbit U contains a second chord S' running parallel to the first-mentioned chord S and with the same length in the sphere with the radius R. The hollow sphere segment is produced with the desired radius $R=\frac{1}{2}(r^2/h+h)$, where r is the radius of the cutting edge orbit U and h the spacing of the chord S from the bearing surface 2, measured on the middle perpendicular to the chord S.

During the second feed movement, the tool can be moved in vertical direction upwardly and in this way the centre point M of the bearing surface region 3 having the radius R above the sphere equator A can be correspondingly displaced relative to the middle point M of the bearing surface region 4 having the same radius R below the sphere equator.

On the other hand, by means of movement of the tool during the second feed movement, with a feed which is somewhat greater than the above-mentioned feed a, the bearing surface region 3 above the sphere equator A can be produced with a radius which is correspondingly larger than the radius R.

After the concave bearing surface 2 has been produced in this way, the tool 14 is withdrawn from the hollow sphere segment. By means of stepped turning of the mounting device relative to the rotary table, the centre bore 5 of the next indentation 7 is brought into coincidence with the axis of rotation of the rotary table; the above described process steps are now repeated.

The cutting movement during both feed movements is made up of the orbital movement of the tool cutting edge 16 and the rotational movement of the workpiece 1 around the vertical axis V. The same cutting movement can be attained with a stationary workpiece 1 by means of a gyroscopic movement of the tool 14 around the vertical axis V whilst maintaining the angle of inclination α.

In contrast to the above-described procedure, the bearing surface region 3 above the sphere equator A may be produced first and then that bearing surface region below the sphere equator A.

The introduction of the tool 14 into the indentation 7 need not necessarily take place along the vertical axis, but can also be effected parallel to the vertical axis.

I claim:

1. Method of producing an undercut, concave and self-contained bearing surface (2), which is at least part of a spherical indentation having an at least approximately constant radius (R), which indentation extends beyond a sphere equator (A) of the spherical indentation by means of machining with the removal of material of a pre-formed indentation (7) in a workpiece (1) by means of a tool (14) having at least one tool cutting edge (16) rotating around a tool axis of rotation (13), defining a plane encompassing the orbit (U) of the tool cutting edge which has a diameter (d) which is equal to the length of a chord (S) extending up to a deepest point ($P_b$) of the bearing surface, whereby a cutting movement of said tool is made up of the orbital movement of the tool cutting edge and a rotational relative movement between the workpiece and the tool around a vertical axis (V) extending perpendicularly of the equator of said spherical indentation through the center (M) thereof, and wherein a feed movement of the tool is a movement of the tool relative to the workpiece along the tool axis of rotation which is obliquely set at a same angle of inclination ($\alpha$) relative to the vertical axis as the plane of the cutting edge orbit is set to the sphere equator (A), characterized in that, the diameter (d) of the plane of the cutting edge orbit (U) originates from the sphere equator (A), and in that a portion of the indentation (7) below the sphere equator (A) and a portion above the sphere equator (A) are machined one after the other with two separate said feed movements.

2. Method according to claim 1, characterized in that, the diameter (d) of the cutting edge orbit plane determining the cutting edge orbit (U) connects the sphere equator (A) with a lower apex point (P) of the bearing surface (2).

3. Method according to claim 1, characterized in that, the bearing surface (2) has the shape of a spherical zone, and in that the diameter (d) of the plane determining the cutting edge orbit (U) connects the sphere equator (A) with a lower limiting edge (6) of the spherical zone.

4. Method according to claim 1, characterized in that, the two feed movements are executed with the tool axis of rotation (13) being in the same disposition and extending in mutually opposite directions.

5. Method according to claim 1, characterized in that, the tool (14) is advanced by movement into the indentation (7) until there is attained a disposition (L) from which the tool is moved with one of the two feed movements along the tool axis of rotation (13), set obliquely at the angle of inclination ($\alpha$), until the tool—upon completion of the bearing surface region (4) below the sphere equator (A)—takes up an end position (S) in which the plane of the cutting edge orbit (U) contains the chord (S) of the sphere having the radius (R).

6. Method according to claim 5, characterized in that, with the other of the two feed movements, the tool (14) is moved along the obliquely set tool axis of rotation (13) having the angle of inclination ($\alpha$) until—upon completion of the bearing surface region (3) above the sphere equator (A)—it takes up a further end position (S') in which the plane of the cutting edge orbit (U) contains a further chord (S') running parallel to the first-mentioned chord (S) and having the same length which runs in the sphere with the radius (R).

7. Method according to claim 5, characterized in that, with the other of the two feed movements, the tool (14) is moved along the obliquely set tool axis of rotation (13) having the angle of inclination ($\alpha$) until—upon completion of the bearing surface region (3) above the sphere equator (A)—it takes up a further end position in which the plane of the cutting edge orbit (U) contains a chord parallel to the first-mentioned chord (S) and of the same length, which runs in a sphere having a radius which is greater than the radius (R) of the sphere with the chord (S).

8. Method according to claim 5, characterized in that, when the tool (14) is in the disposition (L) the intersection point ($S_p$) of the tool axis of rotation (13) with the plane of the cutting edge orbit (U) lies at the sphere centre (M).

9. Method according to claim 1, characterized in that, in addition to the feed movement along the tool axis of rotation (13) executed during the production of the bearing surface portion (3) above the sphere equator (A), the tool (14) is moved in a further feed movement perpendicular to the sphere equator (A) in a direction towards the outside of the indentation (7).

* * * * *